Figure 1:
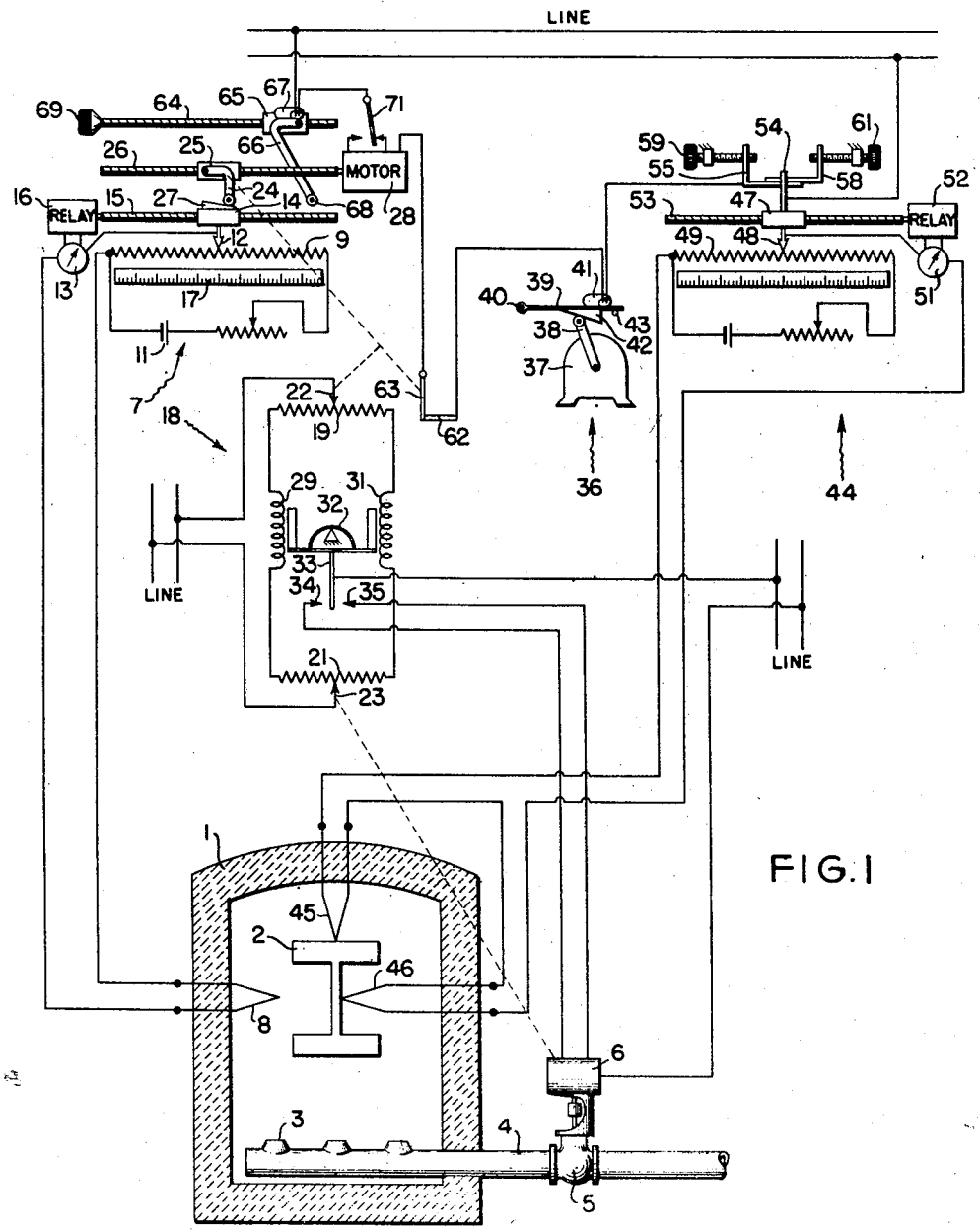

Jan. 10, 1950

J. F. MAIENSHEIN 2,494,135

CONTROL INSTRUMENT

Filed Feb. 27, 1945

2 Sheets-Sheet 1

*INVENTOR*
JOHN FREDERICK MAIENSHEIN

BY
*C. B. Spangenberg*
ATTORNEY

Jan. 10, 1950  J. F. MAIENSHEIN  2,494,135
CONTROL INSTRUMENT
Filed Feb. 27, 1945  2 Sheets-Sheet 2

INVENTOR.
JOHN FREDERICK MAIENSHEIN
BY
Arthur H. Swanson
ATTORNEY.

Patented Jan. 10, 1950

2,494,135

UNITED STATES PATENT OFFICE 2,494,135

CONTROL INSTRUMENT

John F. Maienshein, Parkville, Md., assignor, by mesne assignments, to Minneapolis-Honeywell Regulator Company, Minneapolis, Minn., a corporation of Delaware Application February 27, 1945, Serial No. 580,037

15 Claims. (Cl. 236—15)

The present invention relates to temperature control devices, and more particularly to a control device that is designed to maintain the temperature of a heat treating furnace at a given value and to vary its temperature at a rate at which the furnace and its charge can absorb heat.

Often when heat treating various objects, it is necessary to raise the temperature thereof to some given value, soak the object at this temperature for a predetermined time and then lower its temperature. Naturally the faster the temperature may be raised and lowered without harming the objects being treated, the greater the amount of work that may be done with a given furnace. It is often the case, however, that the objects being treated have thick and thin sections, with the thin sections being able to absorb heat faster than the thick sections. In such a case care must be used in raising the temperature of the furnace, since if the temperature difference between the thick and thin sections of the objects being heated becomes too large, the thin sections might warp or be burned or otherwise damaged.

In accordance with the invention herein a means is provided to control the rate at which the temperature of a furnace is changed. Incorporated in the control device is mechanism which serves to prevent a change in furnace temperature when the temperature thereof falls behind the temperature that is being called for by the control instrument being used, and mechanism which prevents a change in furnace temperature when the difference in the temperature of thick and thin sections of the object being heated becomes dangerously large.

It is an object of this invention to provide a furnace control device in which the temperature of objects of irregular section may be raised at the most rapid rate consistent with the temperature difference between various portions of the object. It is also an object of the invention to provide means by which the temperature of a furnace and the work therein may be raised to some predetermined value as rapidly as possible consistent with the condition of the work.

It is also an object of the invention to provide means which serves to prevent a change in the control point of the control instrument being used when the temperature of the furnace being controlled differs to any appreciable extent from that called for by the instrument.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Fig. 1 of the drawing shows diagrammatically the control device of the present invention.

Figure 2:
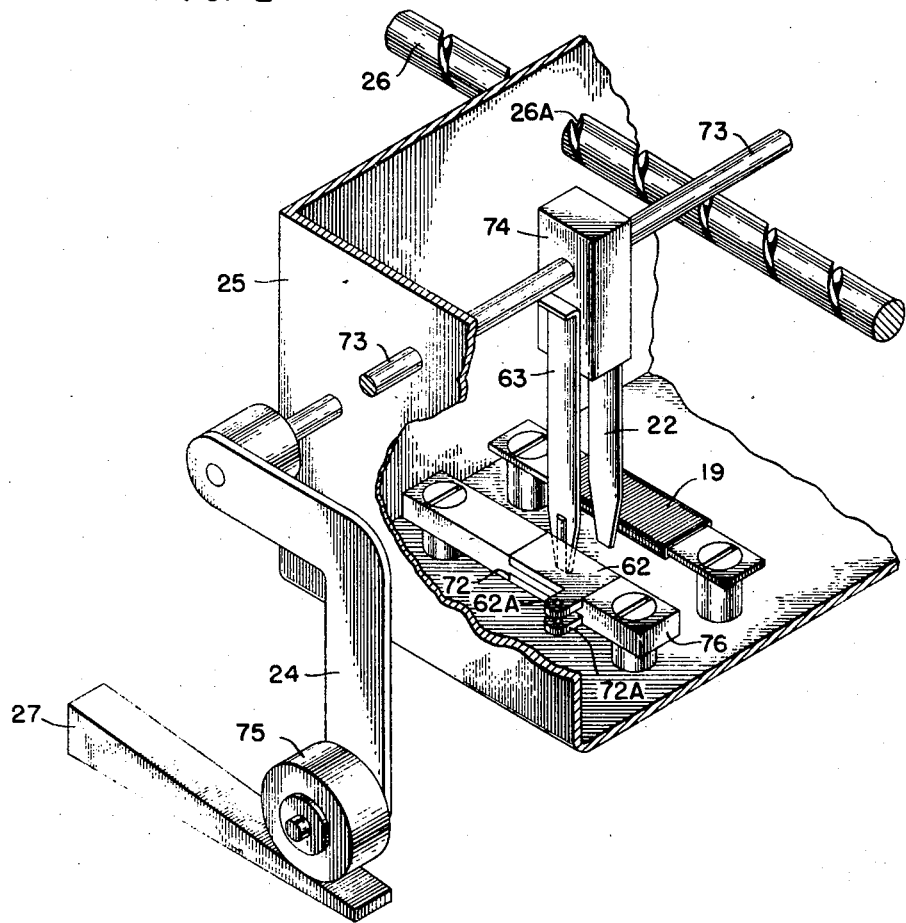

Fig. 2 is a perspective view with parts broken away of the set point adjusting mechanism.

In the drawing there is shown a furnace 1 having in it an object 2 to be heated. The heat for the furnace may be supplied from any suitable source, but in this case is shown as being supplied from a burner 3 to which fuel is fed through a pipe 4. Located in the pipe is a valve 5 that is shown as being operated by an electric motor 6. The temperature of the furnace is measured by a potentiometer 7 whose responsive element is a thermocouple 8 that is suitably located within the furnace. The potentiometer is shown diagrammatically herein but may take the form of that disclosed in Harrison Patent 1,946,280 which was granted on February 6, 1934. In this potentiometer there is a slidewire 9 across which a potential is placed by a battery 11. Opposing a portion of the potential drop across the slidewire is the potential generated by the thermocouple 8. To this end the thermocouple is connected in circuit with a contact 12 that engages the slidewire and a galvanometer 13. In response to galvanometer deflection, indicating that the potentiometer is unbalanced, the contact 12 is moved along the slidewire. This is accomplished by attaching the contact to a carriage 14 and mounting this carriage on a helically threaded shaft 15 that is driven by a relay mechanism 16. In the operation of the device when the temperature of the thermocouple 8 changes, the galvanometer 13 deflects and, through the relay 16 that may be of the type shown in the above mentioned Patent 1,946,280, the shaft 15 is rotated to shift the carriage 14 along it thereby moving the contact 12 to a position along the slidewire 9 in which the galvanometer returns to its neutral position. The location of the contact 12 and the carriage is an indication of the value of the temperature in the furnace and this may conveniently be read upon a suitable scale 17 that is mounted adjacent thereto.

The temperature of the furnace may be controlled by the potentiometer through any suitable type of control system, but is shown herein as being controlled by a so-called proportioning system 18, which consists of a balanced electrical bridge including resistances 19 and 21 which are engaged respectively by contacts 22 and 23. The contacts are connected to an electrical supply line of suitable voltage characteristics. The top contact 22 is moved across the resistance 19 as the temperature of the furnace 1 varies. This is accomplished by means of a connection between this contact and a lever 24 that is pivotally mounted on a control table 25. The table 25 is adjusted through a path parallel to the path traversed by the carriage 14 by means of a second helically threaded shaft 26 upon which it is mounted. Relative movement between the carriage 14 and the carriage 25 will cause movement of lever 24 around its pivot to adjust the contact 22. Such adjustment is provided by means of a cam 27 that is mounted on the carriage 14, which cam serves to move the lever 24 around its pivot as it moves under the lever. As the bridge circuit is unbalanced in response to movement of the contact 22 along the resistance 19, unequal currents will flow through a pair of relay windings 29 and 31 included therein to move a contact carrying member 32 around its pivot. The contact carrying member 32 is provided with armatures that cooperate with the two relay coils so that as more current flows through one coil than the other, the armature of that coil will overcome the armature of the other coil to tilt the member 32. A contact 33 is carried by the member 32 and this contact is moved into engagement with one of the stationary contacts 34 or 35 to close a circuit through the motor 6 and thereby energize this motor for rotation in one direction or the other. As the motor rotates it adjusts the valve 5 to increase or decrease the fuel supply to the furnace, as the case may be, in order to bring the temperature of the furnace back to the control point. Simultaneously the motor 6, through a suitable connection, shifts the contact 23 along the resistance 21 to a position to rebalance the control system. This again causes equal currents to flow through the coils 29 and 31 to bring the contact 33 back to its mid position.

The temperature at which the furnace is maintained is determined by the position of the control carriage 25 along the shaft 26. If this control carriage is near the left end of shaft 26, lever 24 will be moved around its pivot on this carriage in a direction to produce closure of the control valve 5 when the carriage 14 indicates a comparatively low temperature. In like manner if the control carriage 25 is at the right end of shaft 26, the lever 24 will not be moved in a direction to reduce the supply of fuel to the furnace until the carriage 14 has been moved to the right end of its shaft 15, thereby maintaining a much higher temperature in the furnace.

If it is desired to increase or decrease gradually the temperature of the furnace, it is only necessary to rotate the shaft 26 so that the carriage 25 will be moved to the right or to the left respectively at a rate corresponding to the rate at which the temperature of the furnace is to be changed. To this end motor 28 which rotates shaft 26 may be energized intermittently by means of an interrupter mechanism 36. This interrupter mechanism includes a motor 37 that rotates a cam actuating lever 38 at a suitable speed. Also included is a lever 39 pivoted at 40 which has mounted upon it a mercury switch 41 and a cam 42, the latter being adjustable along the length of lever 39. In operation of the interrupter the arm 38 serves to tilt the lever around its pivot, thereby tilting the switch 41 in a direction to open it for a predetermined portion of each revolution of the motor depending upon the position of cam 42. With this switch connected in circuit with the motor 28, that motor will be energized to rotate shaft 26 for varying lengths of time and thereby move the control carriage 25 along this shaft at some selected rate. There is provided a stop 43 to limit the clockwise movement of lever 39.

The circuit of the motor 28 and the switch 41 has in it another switch that is opened or closed depending upon the difference in temperature between the thick and thin sections of object 2 which is being heated in the furnace. The differential temperature of the object 2 is measured by a potentiometer 44 that is similar in construction to the previously mentioned potentiometer and may also take the form of the instrument shown in Patent 1,946,280. The difference between potentiometers 7 and 44 mainly is in the fact that the potentiometer 44 is so calibrated that when the differential temperature of the thick and thin sections of object 2 is zero, the pen carriage of this potentiometer will be at mid-scale position. The responsive elements for this potentiometer are a thermocouple 45 which is responsive to the temperature of the thick section of object 2 and a thermocouple 46 which is responsive to the temperature of the thin section of the object. These thermocouples are so connected that when they are at the same temperature the galvanometer is not deflected and the pen carriage is in its mid-scale position. When, however, the temperature of the thermocouples differ, the contact 48 is moved along a slidewire 49 in resonse to deflection of the galvanometer 51. This galvanometer controls the action of a relay 52 to rotate a shaft 53 upon which the pen carriage 47 is mounted. Also attached to the carriage 47 is a contact 54 which engages contacts 55 and 58. The latter contacts are in electrical engagement with each other and may be adjusted respectively by screws 59 and 61. In the operation of this instrument the contacts 55 and 58 are adjusted lengthwise of the instrument so that their respective ends extend each side of mid-scale of the instrument an amount corresponding to the temperature difference that will be permitted between the thick and thin portions of the object being heated. If the carriage 47 is moved in response to a differential temperature large enough so that contact 54 is moved out of engagement with either contact 55 or 58, the circuit through the interrupter switch 41 and the motor 28 will be broken thereby preventing any further change in the position of control carriage 25 until such time as the differential temperature of the thick and thin portions of object 2 is within the desired limits. This will occur when the thick portion has absorbed more heat, or the thin portion has lost some.

It sometimes happens in the control of the temperature of a furnace that the temperature thereof cannot change as rapidly as the control carriage is moved. This means that the temperature of the furnace is not the same as the control point for which the instrument is set. Therefore even if the control carriage is held still, the control valve will continue to stay in its adjusted position and the temperature of the furnace will change until it has reached the control point. In such a case even if the difference in temperature between the thick and thin portions of object 2 is greater than desired, the temperature of the furnace will continue to change until its temperature equals that called for by the position of the control carriage 25. As the temperature is changing, the differential temperature produced in the object 2 will increase to the detriment of this object. It is necessary, therefore, in order to have a system of this type operate properly that some means be provided to prevent the control carriage from moving faster than the temperature of the furnace can change. This means is provided by a switch which is also located in the circuit of the control table driving motor 28 and which comprises a stationary contact 62 and a movable contact 63. This switch is so arranged that the movable contact 63 is moved by the lever 24 into engagement with the stationary contact 62 to close the switch when the temperature of the furnace is approximately the same as the temperature for which the instrument is at that time set. The difference may be that the instrument can call for a temperature of say 10° higher than the furnace. Such a slight rise in temperature in the furnace would not harm the object to any great extent. If, however, the control carriage is being driven at a rate faster than the furnace temperature can change, the contact 63 will be moved out of engagement with the contact 62 thereby breaking the circuit to motor 28. This gives the furnace temperature a chance to catch up to the position of the control table. Therefore, if the difference in temperature between the thick and thin portions of the work in the furnace should become too great and break the circuit to the motor 28, the temperature of the furnace would not be changed at that time because the furnace temperature is close to that called for by the control instrument as determined by the position of the control carriage 25. The mechanism by which lever 24 drives movable contact 63 and slide wire contact 22 is well known in this art. One form of such mechanism is shown in Jones Patent 2,246,686 granted on June 24, 1941.

Fig. 2 shows the details of this drive mechanism. The control table 25 consists of a sheet metal box in which is pivotally mounted a shaft 73 having a block of insulation 74 fixedly secured thereon. To one end of shaft 73 which projects outside of table 25 is fixed lever 24 which has a cam-following roller 75 pivoted on its free end for cooperation with cam 27. Control table 25 has two holes through its walls, the edges of these holes being formed into tabs 26A for cooperation with the groove in shaft 26 so that rotation of the helical threads on shaft 26 causes the control table 25 to move along the shaft.

Within control table 25 is mounted resistance 19 which forms part of the proportioning system 18 (Fig. 1). Resistor 22 is carried on insulated block 74 and engages at its lower end with one side of resistance 19.

Insulating block 74 also carries movable contact 63. When the contact 63 is in intermediate position, it engages with one edge of the contacts 62 and 72. These contacts are separated from each other by a layer of insulation 76 so that no current passes between contacts 62 and 72 except when they are bridged by movable contact 63. Tab 62A serves for the attachment of a wire to contact 62, while tab 72A performs the like office for contact 72. The contacts 62 and 72 may desirably be shorter than the resistance 19 and positioned as shown with respect to said resistance so that contact 22 will bridge contacts 62 and 72 to close the circuit to motor 28 when the temperature of the furnace is approximately the same as the temperature setting of the carriage 26, or higher than that temperature setting. When the furnace temperature is lower than that temperature setting, the switch contact 63 is moved out of engagement with stationary contacts 62 and 72 and thereby breaks the circuit to motor 28.

In the treating of steel or other metals, it is often desired to raise the temperature of the furnace to some predetermined point and maintain the temperature at that point for a soaking period before the objects being heated or cooled are worked upon. In this system means is also provided to stop the movement of the control table when the predetermined temperature has been reached. To this end there is provided a third helically threaded shaft 64 in the instrument 7, which shaft has mounted upon it a carriage 65. Pivoted to the carriage is a lever 66 that has a mercury switch 67 mounted upon it and which is also provided with a cam following roller 68 that is adapted to cooperate with the cam 27 on the carriage 14. In the arrangement as shown, when the temperature of the furnace has reached some predetermined degree, the carriage 14 will have moved to the right to a position in which the cam 27 mounted thereon will act on lever 66 to open switch 67 and thereby stop operation of motor 28. At this time the motor will remain stationary and the temperature of the furnace will be controlled to a value corresponding to the position at that time of the control table 25.

Also placed in circuit with the motor 28 is a switch 71, which when moved in the position shown, will cause the motor 28 to rotate in a direction to move the control carriage 25 up scale. If the temperature of the furnace has been raised and is now to be lowered at some given rate, the switch 71 can be thrown in any desired manner to its left hand position and the motor 28 will then be energized to rotate in a direction to move the carriage 25 down scale. The rate at which this occurs will depend upon the setting of cam 42 on the lever 39.

The overall operation of the control device should be apparent from the above description of the various parts thereof. In summary, however, it will be seen that the potentiometer 7 tends to control the temperature of furnace 1 to a value corresponding to the position of a control carriage 25. When the temperature of the furnace is to be raised at some predetermined rate, the switch 71 is moved to the position shown and the motor 28 is intermittently energized by the interrupter 36 so that the carriage will be moved up scale and the temperature called for by the instrument gradually raised. In the normal operation of the device this will continue until the temperature, as indicated by the position of the carriage 14, has increased to a value at which the switch 67 will be opened. This is the soaking temperature for the work in the furnace and it will be maintained indefinitely. If, during the process of raising the temperature of the furnace, the difference in temperature between the thick and thin sections of the object 2 being heated becomes too large, the circuit to the motor 28 will be broken, the control table 25 will stay still, and the temperature of the furnace will be maintained at that value until such time as the temperature of all portions of work in the furnace has equalized or has come within predetermined limits. The instrument 44 will at that time again close the circuit to the motor 28 and the operation of raising the temperature of the furnace will continue. If the interruptor 36 is so set that the temperature of the furnace cannot be raised fast enough, the switch 62, 63 will be opened to break the circuit to the motor 28 and thereby prevent an increase in the control point of the instrument until the temperature of the furnace has reached that called for at that time. In this fashion the temperature of the work in the furnace and the temperature of the furnace itself is raised as rapidly as possible with due respect being paid to the condition of the work. At any time when the work is being improperly heated or the furnace temperature is not changing fast enough, adjustment of the controlling potentiometer instrument is arrested until the entire system is stabilized and will then continue to change according to the desired rate.

From the above it will be seen that I have made a temperature control device which may be used to heat metal objects of various cross sections at the most rapid rate consistent with the condition of the metal itself.

While in accordance with the provisions of the statues, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a temperature control device for controlling the temperature of a furnace in which objects of irregular shape are to be heated, a control instrument having adjustable control point adjusting means operative to control the temperature of said furnace at different values, means to change the control point adjusting means to vary the temperature at which said furnace is to be maintained, and means to stop the operation of said control point adjusting means when the temperature of said furnace varies a predetermined amount from the temperature called for by the position of said control point adjusting means.

2. A temperature control device for controlling the temperature of a furnace in which objects of irregular shape are heated, a control instrument having means to adjust the control point thereof to control the temperature of said furnace, means to move progressively said control point adjusting means to change the temperature of said furnace at a predetermined rate, means to render said means to move inoperative when the temperature of said furnace varies more than a predetermined amount from the temperature called for by the adjustment of said control point adjusting means, and means also operative to render said means to move inoperative upon the occurrence of a predetermined difference in temperature of different portions of the object being heated.

3. A temperature control device for controlling the temperature of a furnace in which objects of irregular shape are heated, a control instrument operative to control the temperature of the furnace, said instrument having control point adjusting means to vary the temperature at which the furnace will be maintained, means to adjust said control point adjusting means to vary progressively the temperature at which said furnace is to be maintained, means to measure the temperature difference between different sections of an object being heated in the furnace, means operated by said means to measure to interrupt the operation of said means to adjust when the temperature difference between different sections of the object exceed a predetermined amount, and means to interrupt the operation of said means to adjust when the temperature of the furnace differs a predetermined amount from the temperature called for by the position of said control point adjusting means.

4. A temperature control device for controlling the temperature of a furnace in which objects of an irregular shape are heated, an instrument for controlling the temperature of the furnace, said instrument having control point adjusting means to vary the temperature at which the furnace will be maintained, an electric motor to operate said control point adjusting means, a circuit to control energization of said motor including a first switch, means to close periodically said first switch, a second normally closed switch in said circuit, and means operated by said control instrument to open said second switch when the temperature of said furnace varies a predetermined amount from the temperature called for by the position of said control point adjusting means.

5. A temperature control device for controlling the temperature of a furnace in which objects of irregular shape are heated, a control instrument having control point adjusting means to control the temperature of the furnace, an electric motor to drive said control point adjusting means, an energizing circuit for said motor, a first switch in said circuit, means to open periodically said first switch whereby said motor will drive said control point adjusting means to change the temperature at which the furnace is controlled at a given rate, a second normally closed switch in said circuit, means responsive to the temperature difference between different sections of an object being heated, means operated by said responsive means to open said second switch when said temperature difference reaches a predetermined value, a third normally closed switch in said circuit, and means to open said third switch operated by said control instrument when the temperature of the furnace differs a predetermined amount from the value called for by the adjustment of said control point adjusting means.

6. A temperature control device to control the temperature of a furnace in which objects of irregular shape are heated, a control instrument responsive to the temperature of the furnace, means operated by said control instrument to control the temperature of the furnace, control point adjusting means for said control instrument to vary the value at which said control instrument will maintain the value of the temperature of the furnace, a motor to drive said control point adjusting means, a plurality of means to operate said motor including a first means to drive said motor at a predetermined rate, a second means to stop said motor when the temperature of the furnace differs a predetermined amount from the temperature called for by said control point adjusting means and a third means to stop the operation of said motor when said control point adjusting means has reached a predetermined position.

7. A temperature control device to control the temperature of a furnace in which objects of irregular shape are heated, a control instrument to control the temperature of the furnace, control point adjusting means to vary the value of the temperature said instrument will maintain, an electric motor to drive said control point adjusting means, an energizing circuit for said motor, a first switch in said circuit, means to operate periodically said first switch, a second normally closed switch in said circuit, means operated by said instrument when the temperature of the furnace differs a predetermined amount from that called for by the position of said control point adjusting means to open said second switch, a third normally closed switch in said circuit, means responsive to a difference in temperature between different portions of an object being heated to operate said third switch when said difference in temperature reaches a predetermined amount, a fourth normally closed switch in said circuit, and means to open said fourth switch when said control point adjusting means reaches a predetermined position.

8. In a device for controlling the temperature of a furnace in which objects of irregular shape are to be heated, a control instrument having an adjustable control carriage, an adjustable table engaged and disengaged by said control carriage, a final control element for said furnace fuel supply under the control of said control table, a reversible motor having connections with said control table to drive it to points representing higher or lower temperatures of said furnace, and a switch controlling the supply of power to said motor and having connection with said table so that said switch is opened when said carriage is disengaged from said table in either direction.

9. In a control device for controlling the temperature in which objects of irregular shape are to be heated, a first control instrument having an adjustable control carriage whose position is proportional to temperature of said furnace, a control table mounted to be engaged and disengaged by said carriage, a device controlling the supply of fuel to said furnace and connected for adjustment under the control of said table, a reversible motor driving said table to a position which causes higher or lower temperature of said furnace, a second control instrument responsive to any difference in temperature between various parts of the object to be heated, and an electric switch driven by said second control instrument for controlling the supply of power to said motor so as to shut said supply of power off or to put said power on.

10. In a control device for a furnace for heat treating an object having relatively thick and thin sections, the combination including, a device for controlling the supply of fuel to the furnace, first and second control instruments, said first control instrument being responsive to the temperature of said furnace and proportionately controlling said device for supplying fuel to said furnace, a reversible motor for varying the temperature at which said first control instrument actuates said device, said second control instrument being responsive to any difference in temperature between relatively thick and thin sections of said object, and a switch operated by said second control instrument and controlling the supply of power to said motor so as to cause said motor to run or to stop.

11. In a device for controlling a furnace for heat treating an object having relatively thick and thin sections, the combination including, a device for controlling the supply of fuel to said furnace, first and second control instruments, a mechanical linkage between said first control instrument and said device for controlling said device from said first instrument in response to the temperature in said furnace, said second instrument being responsive to any difference in temperature between the different sections of the object, a motor for adjusting the temperature at which said first instrument tends to maintain said furnace, and a switch connected under the control of said second instrument and controlling the supply of power to said motor.

12. In a device for controlling the temperature of a furnace in which objects having relatively thin and thick sections are to be heat treated, a potentiometer having an adjustable control carriage, an adjustable table arranged to be engaged by and disengaged from said carriage so as to vary the supply of heat to said furnace, a reversible electric motor having mechanical engagement with said table so as to move it so as to increase or decrease the temperature of said furnace, and an electric switch controlling the connections between a source of electricity and said motor so as to energize or de-energize said motor, said switch being moved to motor de-energizing position when said carriage is disengaged from said table.

13. In temperature control device for controlling the temperature of a furnace in which objects of irregular shape are heat treated, a control instrument having a forward and reversely movable carriage positioned proportionally to the temperature of the furnace, a table adapted for engagement with and disengagement from said carriage, a motor having connections for moving said carriage progressively to change the temperature of the furnace at a predetermined rate, a switch controlling the connection of said motor to its supply of power and movable to power-disconnecting position when said table is disengaged from said carriage, a second control instrument responsive to a predetermined difference in temperature of different portions of the object being heated, and a second switch in series with said first switch and the source of power for said motor so as to interrupt the movement of said motor when the difference in temperature between different portions of the object is greater than a predetermined amount.

14. A device for controlling the temperature of a furnace in which objects having relatively thick and thin sections are heat treated, including, a first control instrument operable to control the temperature of the furnace, a movable table operated by said instrument to stabilize the temperature at which the furnace is maintained, a motor for adjusting said table to vary progressively the temperature at which the furnace is to be maintained, a second instrument responsive to the temperature differences between the thick and the thin sections of the object being heated in the furnace, and a switch controlling the supply of power to said motor so as to energize or deenergize said motor, said switch being connected for opening or closing movement under the control of said second instrument.

15. A device for controlling the temperature of a furnace in which an object having relatively thick and thin sections is to be heat treated, including, a first instrument controlling the temperature of the furnace, a forward and reversely movable table operated by said instrument to vary the temperature at which the furnace is maintained, a motor operating said table, a circuit to control energization of said motor including a first switch, a periodically operated motor opening and closing said first switch, a second normally closed switch in said circuit, and second control instrument responsive to a difference in temperature between said thick and said thin sections of the object being heat treated and operating said second switch when the temperature of the sections vary by more than a predetermined amount.

JOHN F. MAIENSHEIN.

REFERENCES CITED

The following references are of record in the file of this patent:

UNITED STATES PATENTS

| Number | Name | Date |
|---|---|---|
| 1,775,682 | Martin | Sept. 16, 1930 |
| 1,815,061 | Harsch | June 21, 1931 |
| 1,893,847 | Simpson | Jan. 10, 1933 |
| 2,202,218 | Mallory | May 28, 1940 |
| 2,232,202 | Bean | Feb. 18, 1941 |
| 2,307,229 | Moore | Jan. 5, 1943 |
| 2,359,651 | Krogh | Oct. 3, 1944 |
| 2,385,308 | Smith | Sept. 18, 1945 |